(12) United States Patent
Kilkkilä

(10) Patent No.: US 6,854,060 B2
(45) Date of Patent: Feb. 8, 2005

(54) METHOD AND SYSTEM IN A TELEPHONE SWITCHING SYSTEM

(75) Inventor: Sami Kilkkilä, Espoo (FI)

(73) Assignee: Nokia Corporation, Espoo (FI)

(*) Notice: Subject to any disclaimer, the term of this patent is extended or adjusted under 35 U.S.C. 154(b) by 380 days.

(21) Appl. No.: 10/007,757

(22) Filed: Nov. 15, 2001

(65) Prior Publication Data

US 2002/0083335 A1 Jun. 27, 2002

Related U.S. Application Data

(63) Continuation of application No. PCT/FI00/00510, filed on Jun. 7, 2000.

(30) Foreign Application Priority Data

Jun. 8, 1999  (FI) .................................................. 991305

(51) Int. Cl.[7] .............................................. H04L 9/00
(52) U.S. Cl. ..................................... 713/176; 370/200
(58) Field of Search ............................... 713/176, 200; 370/200; 360/81; 705/14

(56) References Cited

U.S. PATENT DOCUMENTS

| | | | | |
|---|---|---|---|---|
| 5,315,657 A | * | 5/1994 | Abadi et al. ................ | 713/201 |
| 5,321,841 A | * | 6/1994 | East et al. .................. | 718/107 |
| 5,940,513 A | * | 8/1999 | Aucsmith et al. ........... | 713/187 |
| 6,018,571 A | * | 1/2000 | Langlois et al. ........ | 379/201.04 |
| 6,405,318 B1 | * | 6/2002 | Rowland ..................... | 713/200 |

FOREIGN PATENT DOCUMENTS

| | | |
|---|---|---|
| EP | 0442838 | 8/1991 |
| EP | 0442839 | 8/1991 |
| EP | 0647901 | 4/1995 |
| GB | 2293901 | 4/1996 |
| JP | 11003264 | 1/1999 |
| JP | 11053243 | 2/1999 |
| WO | 00/00896 | 1/2000 |

OTHER PUBLICATIONS

International Search Report for PCT/FI00/00510.
Deng et al, "A Dynamic Access Control Model for Object-Oriented System", IEEE, 1993, p. 159–163.

* cited by examiner

*Primary Examiner*—Kim Vu
*Assistant Examiner*—Thanhnga Truong
(74) *Attorney, Agent, or Firm*—Squire, Sanders & Dempsey L.L.P.

(57) ABSTRACT

Method and system for dynamically modifying access right profiles in the operating system of a computer system or a telephone switching system. In the method, access right profiles having individual command rights to the operating system of the computer system are defined in the computer or telephone switching system. According to the method, the need for modification of the access right profiles in the computer system is recognized; the information contained in the access right profiles is read; the access right profiles which have to be modified are determined; and the access right profiles are modified dynamically as necessary in view of the need for modification that has been recognized.

17 Claims, 2 Drawing Sheets

METHOD AND SYSTEM IN A TELEPHONE SWITCHING SYSTEM

Figure 1:
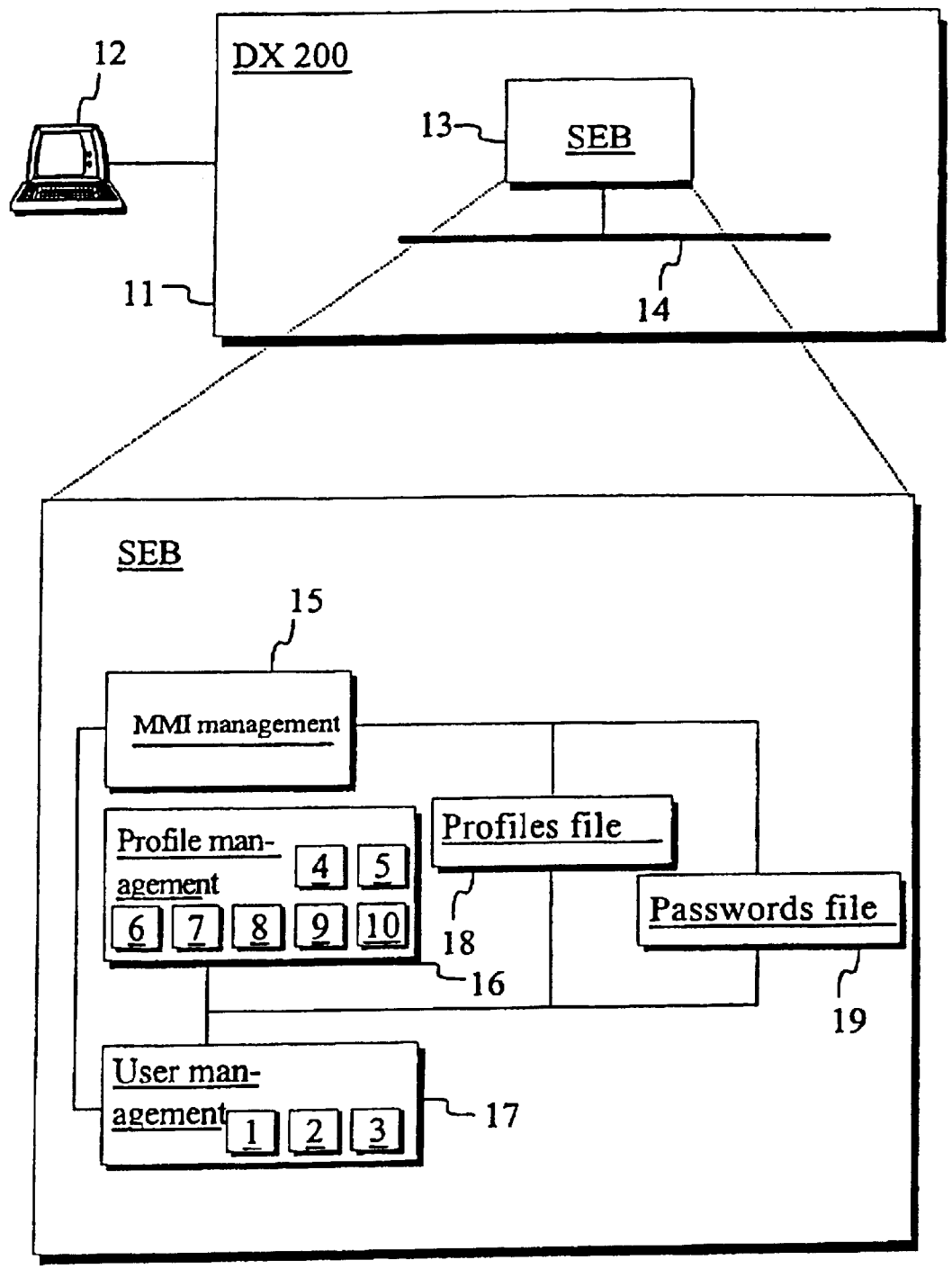

This application is a continuation of international application Ser. No. PCT/FI00/00510, filed 7 Jun. 2000.

FIELD OF THE INVENTION

The present invention relates to a method and system for modifying access right profiles in the operating system of a computer system, especially a telephone switching system.

BACKGROUND OF THE INVENTION

One of the most important components in a telephone network, e.g. the public switched telephone network (PSTN), is the switching center. An example of such switching centers is the DX200 manufactured by Nokia. Telephone switching centers can be interconnected via trunk cables. Thus they form a system designed to allow the provision of various services to the clients.

For a telephone switching system to work properly, it has to be managed. The interface used for the management of a telephone switching system is often called a Man Machine Interface (MMI). Through the management interface, it is possible to control the operation of the telephone switching system and to make changes in the operation control as required.

In the DX 200 telephone switching system and the associated management interface (MMI), the user's authority and rights are determined on the basis of a user identifier (User ID). The MMI system is a certain assembly of software and peripherals, which can be used to execute management control functions. Based on his/her authority and rights, the user may give control commands to the various computer units in the telephone switching system.

For each user identifier, an individual password has been defined to permit user authentication. In some MMI systems, and in computer systems in general, it is possible to create access right profiles applying to users and/or terminals. The access right profile specifies e.g. which MML (Man Machine Language) command language commands the user is authorized to execute. When the user gives a command, the system checks whether the access right profile is authorized to execute that command. A given user identifier is associated with certain access rights, and so is a given access right profile.

An access right profile pertaining to a given set of terminals defines the circumstance that sessions relating to the management of the computer system or telephone switching system can only be activated from a given terminal on certain conditions.

A problem with the above-mentioned access right definition is that rights once defined remain valid until they are modified again. In practice, the modification is carried out e.g. manually by the operator. In other words, the access rights or access right profiles are at present in no way dependent on the prevailing conditions, e.g. the time of the day or the utilization rate of the system.

The object of the present invention is to eliminate the drawbacks referred to above or at least to significantly alleviate them.

A specific object of the invention is to disclose a new type of method and system whereby access right profiles can be modified dynamically in a telephone switching system.

As for the features characteristic of the present invention, reference is made to the claims.

BRIEF DESCRIPTION OF THE INVENTION

The method of the invention concerns dynamic modification of access right profiles in a computer system, especially a telephone switching system.

According to the invention, in the telephone switching system, access right profiles having individual command rights to the operating system of the telephone switching system are defined.

In the method of the present invention, the need for modifying the access right profiles in the computer system or telephone switching system is recognized. In this context, recognizing means e.g. that an event implying a change in the access right profiles takes place. The information contained in the access right profiles is read to establish which ones of the access right profiles need to be changed. Triggered by a given event, the need for modifying the access right profiles does not necessarily apply to all the access right profiles defined in the computer system or telephone switching system. After it has been established which access right profiles have to be modified, they are changed dynamically as required in view of the need for change that has arisen.

The information relating to the access right profile includes data defining e.g. command class-specific powers, validity period of the password, level of access to the MML command log and type of the access right profile in question. Type means that the access right profile may comprise one or more users or terminals. Further, the profile information may contain data indicating whether remote sessions are allowed. A need for changing the access right profiles may be triggered e.g. by the time of the day, the utilization rate of the telephone switching system, or a given alarm situation. Further, it is possible to modify the access right profiles as a function of session duration and/or operation commands used and/or number of sessions held. Changes in the access right profiles can also be made even if a session consistent with a given access right profile should be active.

The rights associated with an access right profile may be defined e.g. so that the rights are less extensive at night time than at day time. This may be desirable e.g. when supervision in the working premises is scant and the number of people at work is smaller than at day time. The access right profiles can also be changed as a function of the utilization rate of the telephone switching system. If the utilization rate of the telephone switching center exceeds a certain limit, then it may be necessary to modify the rights included in the access right profiles so that only commands of the most important nature can be executed. Similarly, when the telephone network is heavily loaded, it may be necessary to limit the number of remote sessions. Changes made in the access right profiles may also relate to functionality. An example of this is a situation where the execution of a given function is not allowed if a certain condition prevails in the telephone switching system.

The system of the present invention comprises means for recognizing a need for modification of the access right profiles in a computer system or telephone switching system and means for reading the information contained in the access right profiles. Furthermore, the system comprises means for establishing which ones of the access right profiles have to be modified and means for changing the access right profiles dynamically as necessary in view of the need for modification that has been recognized.

The system of the present invention comprises means for modifying the access right profiles as a function of time and means for modifying the access right profiles as a function of the utilization rate of the telephone switching system.

The system further comprises means for modifying the access right profiles when a predetermined alarm situation arises in the telephone switching system and means for modifying the access right profiles as a function of session duration and/or operation commands used and/or number of sessions held.

The present invention enables the access right profiles associated with a computer or telephone switching system to be modified dynamically on the basis of pre-defined conditions. Thus, the access right profiles in the telephone switching system are adapted to the prevailing circumstances.

LIST OF ILLUSTRATIONS

Figure 2:
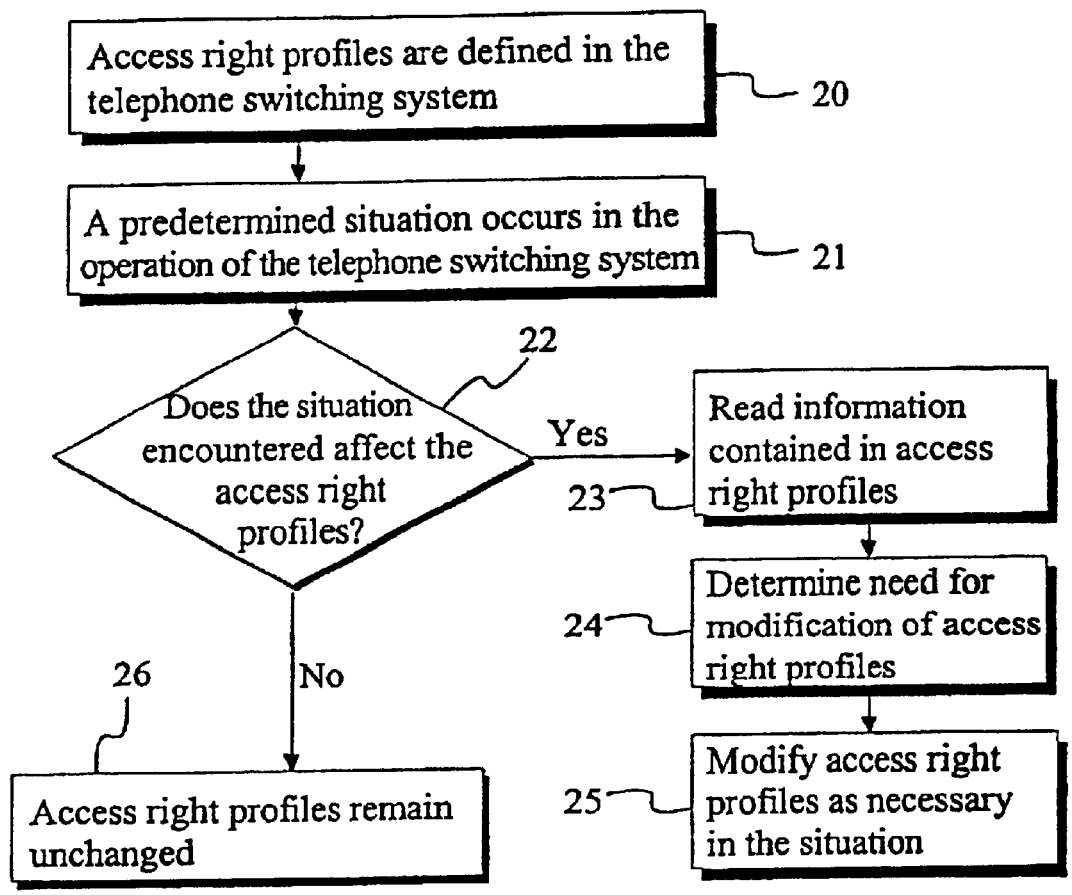

In the following, the invention will be described in detail by the aid of a few examples of its embodiments, wherein:

FIG. 1 illustrates a preferred system according to the invention,

FIG. 2 presents a preferred functional block diagram according to the invention.

DETAILED DESCRIPTION OF THE INVENTION

The system presented in FIG. 1 comprises a telephone switching center 11 and a workstation 12 linked to it. From the workstation 12, users can control the operation of the telephone switching center 11. The telephone switching center 11 comprises a communication bus 14 with a service block (SEB) 13 connected to it. The function of the communication bus 14 is to serve as an internal data transfer route within the telephone switching center 11.

The function of the service block (SEB) 13 is to serve as a controller of the functions relating to access right profiles. One of the functions of the service block 13 is to create new access right profiles and to change or delete existing ones as necessary. An essential part of the activity of the service block 13 is to function as a kind of distributor of access rights. If the command rights of the access right profiles need to be changed, the service block 13 is responsible for carrying out the changes.

The service block 13 comprises an MMI management block 15, which serves as a program module controlling the functions. These include e.g. the transmission of information between the workstation 12 and the central system. The service block 13 additionally comprises a profile management block 16, a user management block 17, a profiles file 18 and a passwords file 19.

The user interface is implemented by the profile management block 16, by means of which the user identifiers and access right profiles are managed. The profiles file 18 contains information regarding existing profiles in the telephone switching system while the passwords file 19 contains passwords associated with existing user identifiers. The profiles file contains authority data fields for different profiles. The authority data are checked in conjunction with each MML command. The functions of the user management block 17 relate to the treatment of passwords and user identifiers and related matters.

The user management block 17 comprises means 1 for recognizing a need for modification of the access right profiles in the telephone switching system. Using means 2, the information contained in the access right profiles is read. Moreover, the user management block 17 contains means 3 for establishing which ones of the access right profiles need to be modified.

The profile management block 16 comprises means 4 for dynamically changing the access right profiles in a manner corresponding to the need for modification that has arisen in the telephone switching system. Using means 5, an access right profile comprising one or more user identifiers is defined in the telephone switching system. Means 6 serve to define in the telephone switching system an access right profile comprising one or more terminals. The profile management block 16 additionally comprises means 7 for modifying the access right profiles as a function of time. Means 8 are used to modify the access right profiles as a function of the utilization rate of the telephone switching system. Means 9 serve to modify the access right profiles for the telephone switching system when a predetermined alarm situation arises in the telephone switching system. The profile management block 16 additionally comprises means 10 for modifying the access right profiles in the telephone switching system as a function of session duration and/or operation commands used and/or number of sessions held.

Means 1–10 are preferably implemented as program modules using a computer.

In an embodiment as illustrated in FIG. 1, changes in the access right profile are bound to the time of the day. In this example, the authority of the access right profile is dropped to a lower level for night time. The operator defines the start and end times for "day" and "night". This information is specific to the profile, so it can be defined separately for each profile. The profiles file contains authority data fields for both "night" and "day" profiles. The authority data are checked in conjunction with each MML command. The current time is compared with the time limits for the profile and, based on this comparison, a decision regarding the access rights is made.

In an embodiment as illustrated in FIG. 1, the access right profiles are modified as a function of the utilization rate of the telephone switching system. If the utilization rate of the telephone switching system exceeds a given limit, then it may be necessary to modify the rights associated with certain access right profiles so that only commands of the most important nature can be executed. Similarly, when the telephone network is heavily loaded, it may be necessary to limit the number of remote sessions. The rights of access the right profiles regarding the operating system of the telephone switching system may further be affected by a predetermined alarm situation.

In an embodiment as illustration in FIG. 1, the access right profiles are modified as a function of session duration, operation commands used or e.g. the number of sessions held. Stored in the access right profile data is a limit value which preferably applies to one of the above-mentioned parameters. In addition, the limit value may be a combination of these parameters. When the limit is exceeded, the access right profile is changed in a predetermined manner. An access right profile may be denied command rights to the operating system of the telephone switching system. The rights may also be so modified that only certain commands are available. As an example, let us consider a case where an access right profile is entitled to ten times of log-on into the operating system of the telephone switching system. After this number of log-on times has been used up, it will no longer be possible to log on into the operating system of the telephone switching system with the user identifiers comprised in the access right profile.

FIG. 2 illustrates the operation of the present invention in the form of a flow diagram presented as an example. As stated in block 20, access right profiles are defined in the telephone switching system. In this context, "profile" means that a given group of users or terminals has similar properties. In the telephone switching system, a situation occurs that may affect the existing access right profiles, block 21. According to block 22, the situation is analyzed in the telephone switching system and a decision is made as to whether the situation has an effect on the above-mentioned access right profiles. If the situation does affect the access right profiles, then the procedure will go on to block 23, according to which the information contained in the access right profiles is read. The next task is to establish which ones of the access right profiles have to be modified, block 24. Once the access right profiles to be modified have been determined, they are modified as necessary in view of the situation, block 25. In practice, the changes apply e.g. to a case where a limitation is set on the command rights associated with certain access right profiles regarding the operating system of the telephone switching system. If the situation encountered does not require any modification of the access right profiles, then the procedure will go on to block 26.

The invention is not restricted to the examples of its embodiments described above; instead, many variations are possible within the scope of the inventive idea defined in the claims.

What is claimed is:

1. Method for dynamically modifying access right profiles of users in the operating system of a computer system, said method comprising the steps of:

defining in the computer system access right profiles having individual command rights to the operating system of the computer system, wherein the method further comprises the steps of:

recognizing the need for modification of at least one of the defined access right profiles in the computer system, wherein the need for modifying the access right profile is triggered by prevailing circumstances of the computer system;

reading the information contained in the defined access right profiles in the computer system;

establishing, based on the information contained in the access right profiles and the prevailing circumstances of the computer system, which access right profiles have to be modified; and modifying at least one of the access right profiles dynamically as necessary according to the prevailing circumstances.

2. Method as defined in claim 1, wherein an access right profile comprising one or more user identifiers is defined in the computer system.

3. Method as defined in claim 1, wherein an access right profile comprising one or more terminals is defined in the computer system.

4. Method as defined in claim 1, wherein the access right profiles in the computer system are modified as a function of time.

5. Method as defined in claim 1, wherein the access right profiles in the computer system are modified as a function of the utilization rate of the computer system.

6. Method as defined in claim 1, wherein the access right profiles in the computer system are modified when a predetermined alarm situation occurs in the computer system.

7. Method as defined in claim 1, wherein the access right profiles in the computer system are modified as a function of session duration and/or operation commands used and/or number of sessions held.

8. Method as defined in claim 1, wherein the access right profile in the computer system is modified even if a session consistent with an access right profile should be active.

9. Method as defined in claim 1, wherein the computer system is a telephone switching system.

10. System for dynamic modification of access right profiles of users in the operating system of a computer system, in which access right profiles having individual command rights regarding the operating system of the computer system have been defined, wherein the system comprises:

means for recognizing the need for modification of at least one of the defined access right profiles in the computer system, wherein the need for modifying the access right profile is triggered by prevailing circumstances of the computer system;

means for reading the information contained in the defined access right profiles in the computer system;

means for establishing, based on the information contained in the access right profiles and the prevailing circumstances of the computer system, which access right profiles have to be modified; and means for modifying at least one of the access right profiles dynamically as necessary according to the prevailing circumstances.

11. System as defined in claim 10, wherein the system comprises means for defining in the computer system an access right profile comprising one or more user identifiers.

12. System as defined in claim 10, wherein the system comprises means for defining in the computer system an access right profile comprising one or more terminals.

13. System as defined in claim 10, wherein the system comprises means for modifying the access right profiles as a function of time.

14. System as defined in claim 10, wherein the system comprises means for modifying the access right profiles in the computer system as a function of the utilization rate of the telephone switching system.

15. System as defined in claim 10, wherein the system comprises means for modifying the access right profiles in the computer system when a predetermined alarm situation occurs in the telephone switching system.

16. System as defined in claim 10, wherein the system comprises means for modifying the access right profiles in the computer system as a function of session duration and/or operation commands used and/or number of sessions held.

17. System as defined in claim 10, wherein the computer system is a telephone switching system.

* * * * *